(12) United States Patent
Youngquist et al.

(10) Patent No.: US 9,477,857 B2
(45) Date of Patent: Oct. 25, 2016

(54) SURFACE ACOUSTIC WAVE TAG-BASED COHERENCE MULTIPLEXING

(71) Applicants: University of Central Florida Research Foundation, Inc., Orlando, FL (US); The United States of America as Represented by the Administrator of the National Aeronautics and Space Administration, Washington, DC (US)

(72) Inventors: Robert C. Youngquist, Cocoa, FL (US); Donald Malocha, Winter Springs, FL (US); Nancy Saldanha, Baltimore, MD (US)

(73) Assignees: University of Central Florida Research Foundation, Inc., Orlando, FL (US); The United States of America as Represented by the Administrator of the National Aeronautics and Space Administration, Washington, DC (US)

( * ) Notice: Subject to any disclaimer, the term of this patent is extended or adjusted under 35 U.S.C. 154(b) by 99 days.

(21) Appl. No.: 13/961,521

(22) Filed: Aug. 7, 2013

(65) Prior Publication Data

US 2014/0043946 A1 Feb. 13, 2014

Related U.S. Application Data

(60) Provisional application No. 61/680,840, filed on Aug. 8, 2012.

(51) Int. Cl.
| | |
|---|---|
| *H04B 10/61* | (2013.01) |
| *G06K 7/02* | (2006.01) |
| *G06K 7/10* | (2006.01) |
| *G06K 19/067* | (2006.01) |
| *G02B 6/12* | (2006.01) |
| *H04J 14/00* | (2006.01) |

(52) U.S. Cl.
CPC .............. *G06K 7/02* (2013.01); *G06K 7/10306* (2013.01); *G06K 19/0675* (2013.01); *G02B 2006/12164* (2013.01); *H04B 10/61* (2013.01); *H04B 10/616* (2013.01); *H04J 14/00* (2013.01); *H04J 14/002* (2013.01)

(58) Field of Classification Search
CPC ...... H04J 14/00; H04J 14/002; H04B 10/61; G02B 2006/12164; G06K 19/0675; G06K 7/10306
USPC ............... 250/227.19, 227.27; 358/478, 479; 367/197; 370/537; 398/43
See application file for complete search history.

(56) References Cited

U.S. PATENT DOCUMENTS 4,622,525 A * 11/1986 Brown ................. H03H 9/0285
310/313 D
4,799,797 A 1/1989 Huggins
(Continued)

*Primary Examiner* — Benjamin C Lee
*Assistant Examiner* — Benyam Haile
(74) *Attorney, Agent, or Firm* — Jetter & Associates, P.A.

(57) ABSTRACT

A surface acoustic wave (SAW)-based coherence multiplexing system includes SAW tags each including a SAW transducer, a first SAW reflector positioned a first distance from the SAW transducer and a second SAW reflector positioned a second distance from the SAW transducer. A transceiver including a wireless transmitter has a signal source providing a source signal and circuitry for transmitting interrogation pulses including a first and a second interrogation pulse toward the SAW tags, and a wireless receiver for receiving and processing response signals from the SAW tags. The receiver receives scrambled signals including a convolution of the wideband interrogation pulses with response signals from the SAW tags and includes a computing device which implements an algorithm that correlates the interrogation pulses or the source signal before transmitting against the scrambled signals to generate tag responses for each of the SAW tags.

17 Claims, 11 Drawing Sheets

(56) References Cited

U.S. PATENT DOCUMENTS

| | | | |
|---|---|---|---|
| 7,777,625 B1* | 8/2010 | Puccio et al. | 340/572.1 |
| 2002/0140598 A1* | 10/2002 | Stierlin | H03H 9/6406 342/51 |
| 2007/0046479 A1* | 3/2007 | Hines | 340/584 |
| 2007/0064765 A1 | 3/2007 | Solie | |
| 2007/0279188 A1* | 12/2007 | Thiesen et al. | 340/10.1 |
| 2010/0039000 A1* | 2/2010 | Milson et al. | 310/366 |
| 2013/0181573 A1* | 7/2013 | Hines et al. | 310/313 R |

\* cited by examiner

SURFACE ACOUSTIC WAVE TAG-BASED COHERENCE MULTIPLEXING

CROSS REFERENCE TO RELATED APPLICATIONS

This application claims the benefit of Provisional Application Ser. No. 61/680,480 entitled "SURFACE ACOUSTIC WAVE TAG-BASED COHERENCE MULTIPLEXING", filed Aug. 8, 2012, which is herein incorporated by reference in its entirety.

U.S. GOVERNMENT RIGHTS

This invention was made with Government support based on one of the Inventors being a National Aeronautics and Space Administration (NASA) employee. The Government has certain rights in this invention.

FIELD

Disclosed embodiments relate to surface acoustic wave sensors.

BACKGROUND

Coherence multiplexing in optics is known, allowing light reflected from an object to be decomposed, providing information on the location and magnitude of the various reflection sites within the object. This concept has been used in optics and other fields, including the medical community where it is used to interrogate the inner structures of the eye in optical coherence tomography (OCT).

A surface acoustic wave (SAW) is an acoustic wave traveling along the surface of a substrate material exhibiting elasticity, with an amplitude that decays exponentially with depth into the substrate material. Electronic devices employing SAWs typically use one or more interdigital transducers (IDTs) to convert acoustic waves to electrical signals and electrical signals to acoustic waves by using a thin metal film structure deposited on top of a piezoelectric crystal substrate to exploit the piezoelectric effect of certain materials (quartz, lithium niobate, lithium tantalate, lanthanum gallium silicate, etc.). The layout pattern of the input/output thin metal film patterns can be designed to provide the desired bandpass filtering function $H(f)=V_{output}/V_{input}$ as the SAW propagates along the piezoelectric crystal surface. SAW devices are conventionally fabricated by deposition, photolithography and etch, the same processing used in the manufacture of conventional silicon-based integrated circuits.

SAW sensors are known for sensing a variety of physical, chemical and biological parameters. SAW sensors can provide delay lines, resonators, and devices with multiple frequency and time coded reflective structures. In single sensor systems, sensor identification is not required and therefore no encoding of the SAW device is required. In a multi-sensor system, the sensor is generally identified while simultaneously obtaining sensed information. Coherence multiplexing is not known in the field of SAW sensors.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments combine coherence multiplexing with surface acoustic wave (SAW) multiplexing to realize SAW tag-based coherence multiplexing. Although coherence multiplexing is known in optics, conventional SAW-based systems operate differently as compared to optical systems, and thus would not be expected to be combinable by one having ordinary skill in the art. For example, coherence multiplexing-based optical systems operate with the light source always on (continuously) and wirelessly where the optical signal is propagating, while conventional SAW-based systems operate as pulsed systems with signals propagating within piezoelectric substrates.

Disclosed SAW tag-based coherence multiplexing systems are operated in pulsed mode, so that both the SAW multiplexing and coherent multiplexing operate in pulsed mode, with each interrogation pulse for coherent multiplexing being different, which as evidenced below is found to provide a substantial signal to noise ratio (SNR) improvement. Different pulses can be implemented by sampling a "noise" source, or generally using any signal source that can provide different pulses. A noise signal is random and changes with every interrogation cycle. Each interrogation pulse once returned by the SAW tag (sensor) provides information on the SAW tag, and having the signal (e.g., noise) from each pulse being different after averaging allows the noise floor to be reduced, resulting in a significant improvement in the SNR of the signals from the SAW tags.

Disclosed SAW tag-based coherence multiplexing utilize at least one SAW transducer including an interdigitated thin metal film structure on a piezoelectric crystal substrate, and a first broadband SAW reflector and at least a second broadband SAW reflector on the piezoelectric substrate positioned different distances from the SAW transducer. Disclosed SAW tags (sensors) can be used in a multi-sensor environment for simultaneous sensing and identification by multiplexing multiple SAW tags.

An ultra-wideband (UWB) spread spectrum approach is disclosed herein where the SAW tags are interrogated by a band-limited and time-limited white Gaussian noise (WGN) signal. However, other broadband signals may be used. The SAW tags are coded, such as using time division multiple access (TDMA) coding or with reflectors that are frequency coded.

The transceiver can interrogate the SAW tags with interrogation pulses (e.g., a UWB white Gaussian noise signal) while simultaneously storing the transmitted interrogation signal for later post-processing of the received SAW tag signal data. The transceiver then can receive the responses from the SAW tags and through correlation with the saved interrogation signal allows generation of the SAW tag data. Several integration cycles can be used to enhance the dynamic range of the sensed SAW tag signal thus allowing for enhanced isolation between SAW tags. Disclosed SAW tag-based coherence multiplexing has advantages including improved dynamic range, security and the use of multiple SAW tags.

DETAILED DESCRIPTION

Figure 1:
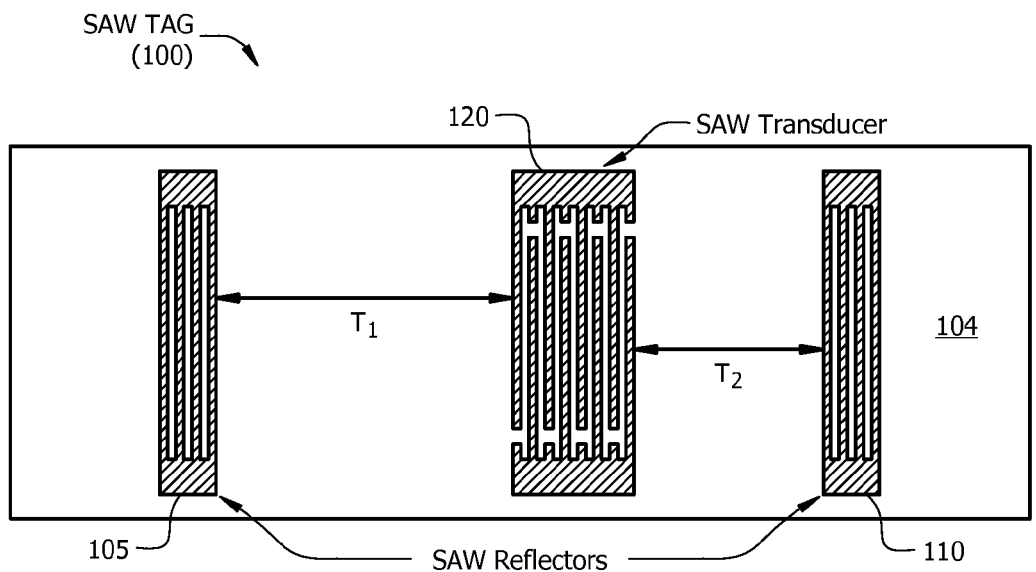
FIG. 1 is a schematic diagram and example SAW tag including a SAW transducer and two SAW reflectors, according to an example embodiment.

Disclosed embodiments in this Disclosure are described with reference to the attached figures, wherein like reference numerals are used throughout the figures to designate similar or equivalent elements. The figures are not drawn to scale and they are provided merely to illustrate the disclosed embodiments. Several aspects are described below with reference to example applications for illustration. It should be understood that numerous specific details, relationships, and methods are set forth to provide a full understanding of the disclosed embodiments.

One having ordinary skill in the relevant art, however, will readily recognize that the subject matter disclosed herein can be practiced without one or more of the specific details or with other methods. In other instances, well-known structures or operations are not shown in detail to avoid obscuring structures or operations that are not well-known. This Disclosure is not limited by the illustrated ordering of acts or events, as some acts may occur in different orders and/or concurrently with other acts or events. Furthermore, not all illustrated acts or events are required to implement a methodology in accordance with this Disclosure.

A first disclosed embodiment comprises a method of SAW tag-based coherence multiplexing using a plurality of disclosed SAW tags (sensors) that each include at least one SAW transducer and a plurality of SAW reflectors. A SAW transceiver interrogates the SAW tags with broadband pulses, such as an ultra-wideband (UWB) white Gaussian noise signal that can be sampled to provide different pulses, and a scrambled signal which is the convolution of the interrogation signal with the tag signal is received by the receiver. Since a noise signal is random and changes with every interrogation cycle, the receiver cannot have knowledge of the transmit signal without capture. Several scrambled SAW tag responses (from the respective SAW tags) arrive at the receiver antenna simultaneously. At the transceiver, the original interrogation pulse signal (e.g., white Gaussian noise) is saved and is correlated against the received scrambled response to yield the individual SAW tag responses. The results of several interrogations with unique (different) interrogation pulses (e.g., sampled white Gaussian noise signals) are integrated to yield a large SNR, thus providing increased isolation between multiple SAW tag responses. The interrogation source can be modified for each sweep to gain the benefit of coherence integration. The number of sweeps can be chosen from 1 to N, where N can be very large ($>10^6$ if required) to obtain a desired SNR level.

A second embodiment provides the use of broadband reflective structures in a SAW device for SAW ID tags and sensors. The SAW tag includes at least one SAW transducer and at least two SAW reflectors, and the SAW reflectors are placed so that each SAW reflector produces a narrow pulse in the time domain that is spaced strategically to provide time division coding and minimal interference between SAW tags in the multi-tag system.

A third embodiment provides the orthogonal frequency coding technique applied to each SAW reflector in the SAW tag to provide an additional layer of frequency coding for enhanced code security. For this embodiment the scrambled sensor signals received at the transceiver are correlated against the original saved interrogation noise signal to recover the frequency coded device signals. The recovered device signals can then be matched filtered against desired tag matched filter to produce a compressed correlation pulse that yields added processing gain due to the spread spectrum nature of the device code.

A fourth embodiment uses Bragg reflectors as the broadband SAW reflectors. A fifth embodiment uses orthogonal frequency coded (OFC) or similar SAW reflectors in parallel, which offers coding and processing gain while maintaining a short pulse reflection time length.

To describe disclosed embodiments, an example 2 chip per SAW tag, 4 SAW tag multi-sensor system is generally used for the purpose of illustration. However, disclosed embodiments are in no way limited to this particular arrangement.

FIG. 1 is a schematic of an example SAW tag 100 known for time domain operation, not for coherence multiplexed operation as disclosed herein which can be used with disclosed embodiments. SAW tag 100 includes a piezoelectric substrate 104 having at least one SAW transducer 120 and at least two SAW reflectors 105, 110 thereon. The SAW reflectors 105 and 110 are shown positioned different distances from the SAW transducer 120 to provide different time delays (shown as $T_1$ and $T_2$) such that there is minimal overlap of each SAW reflectors' time responsive to an interrogation signal. The positions of the SAW reflectors 105 and 110 can be selected such that any two adjacent SAW reflector positions will be a minimum of four to five coherence lengths apart. A minimum of two SAW reflectors are used for each SAW tag, since any change in external stimuli to be sensed, such as in temperature or pressure, will cause a change in time delay. The difference in time delay between the two or more SAW reflectors in each SAW tag can be used to identify individual SAW tags in a multi-tag system.

The coherence length is given by the ratio of the SAW velocity to the bandwidth of the SAW tag 100, and is the minimum distance between two adjacent SAW reflectors 105 and 110 that can be resolved. For a YZ-cut LiNbO$_3$ substrate as the piezoelectric substrate 104 used for the SAW reflectors 105 and 110 in one example, the SAW velocity is 3,488 m/s and the bandwidth of the device is 174 MHz, which yields a coherence length (L) of 20 microns, where L is the length of the acoustic wave defined as the minimum distance between two spatial reflection sites that can be resolved.

Separating the SAW reflectors 105 and 110 by a minimum distance of 4 L has been found to provide a recovered signal with high resolution. Fairly short reflector structures such as SAW reflectors 105 and 110 shown in FIG. 1 can have fairly wide bandwidths, but may have significant insertion loss. In order to have a wide bandwidth the SAW reflectors cannot have many individual reflection elements and thus cannot reflect substantial energy. Adding reflector elements increases the amount of reflected energy, but narrows the bandwidth of the reflective structure.

Figure 2:
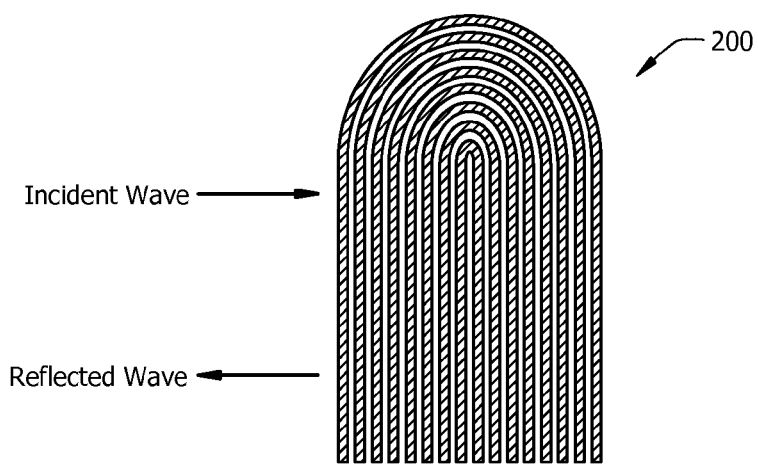
FIG. 2 is a reflective multi-strip SAW coupler which can be used as a broadband reflector for disclosed SAW tags.

In order to reduce the insertion loss, in one particular embodiment the SAW reflectors can comprise the U-shaped reflective multistrip SAW coupler (RMSC) 200 shown in FIG. 2 which can be used for the SAW reflectors in disclosed SAW tags, such as for the SAW reflectors 105 and 110 shown in FIG. 1. For example, See L. Reindl, "Track Changing Structures on YZ LiNbO$_3$", IEEE Ultrasonics Symposium Proceedings., vol. 1, no., pp. 77-82 vol. 1, 5-8 Oct. 1997). RMSC's have high reflectivity and fairly broad fractional bandwidths of ~50% and higher.

Figure 3:
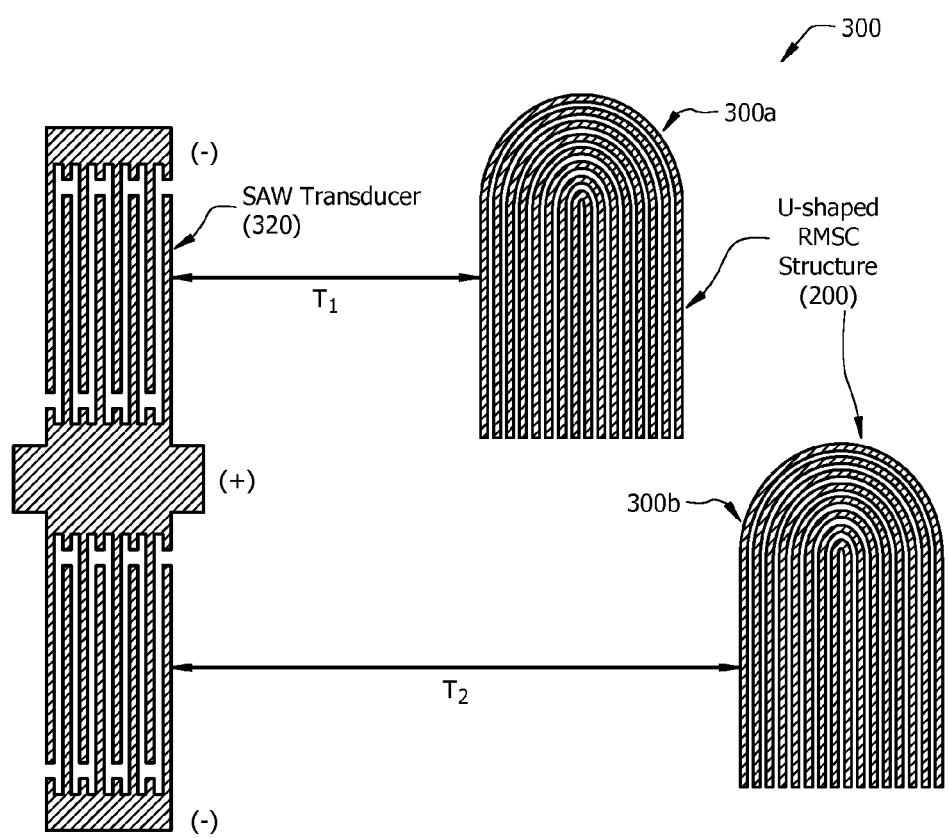
FIG. 3 is a schematic diagram of a SAW tag showing SAW reflectors placed in separate tracks to minimize spurious echoes in the time domain.

In order to minimize spurious multiple reflections, a SAW tag 300 can have the RMSCs 300a and 300b placed in separate tracks as shown in FIG. 3. A "track" refers to a SAW transducer with only one RMSC. RMSC structures 300a and 300b in each track may be placed strategically such as depicted in FIG. 3 so that there is essentially no interference in their time responses. Additionally, the SAW transducer can comprise a unidirectional SAW transducer to minimize multiple transit echoes that can interfere with other tag responses in the multi-sensor environment. Unidirectional SAW transducers are well developed and documented in open literature. For enhanced code security each SAW reflector in the SAW tag can be implemented using a frequency coding scheme, such as orthogonal frequency coding disclosed by Malocha et. al (See Puccio, D.; Malocha, D. C.; Saldanha, N.; Gallagher, D. R.; Hines, J. H.; "Orthogonal frequency coding for SAW tagging and sensors," IEEE Transactions on Ultrasonics, Ferroelectrics and Frequency Control, vol. 53, no. 2, pp. 377-384, February 2006).

Figure 4:
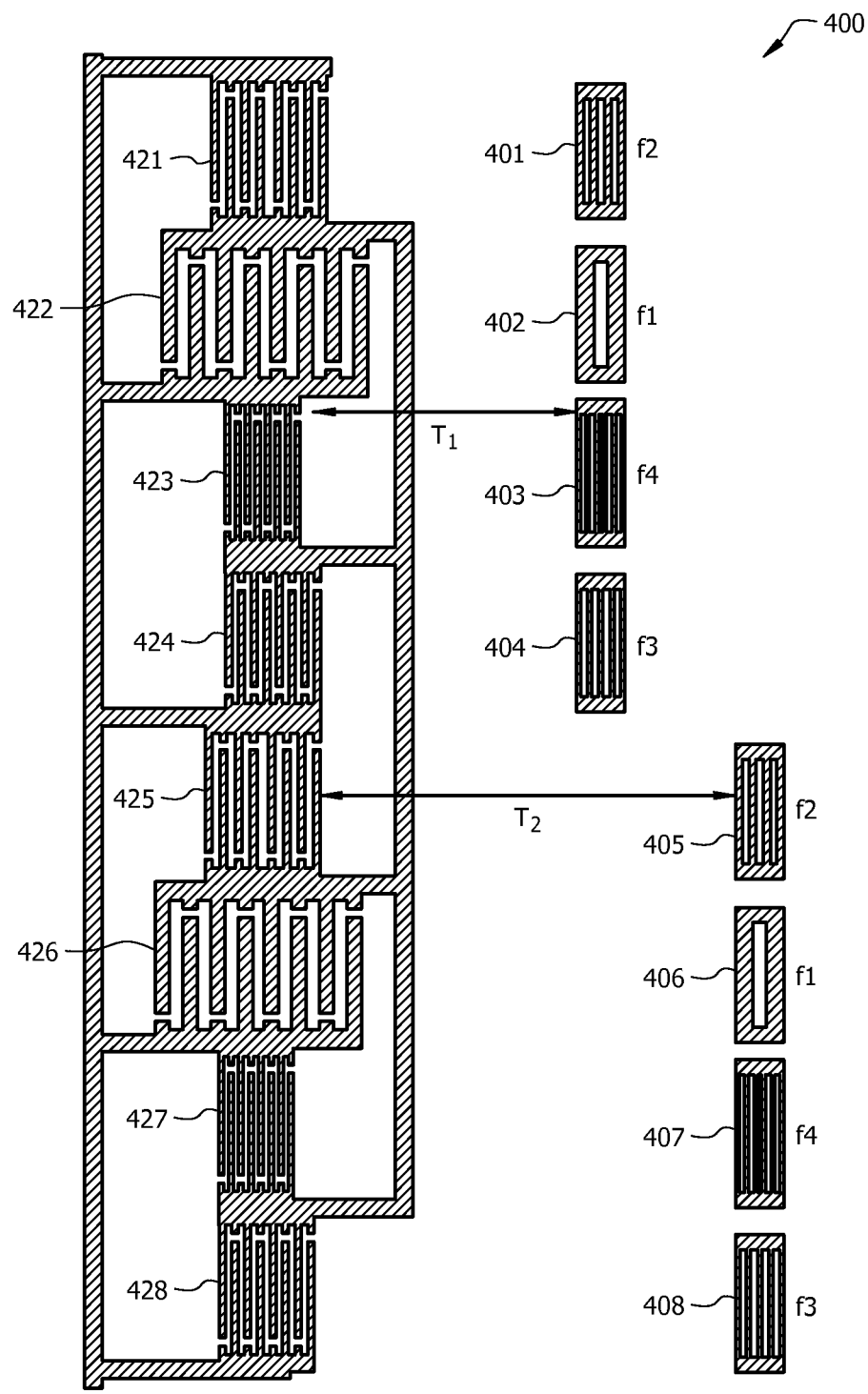
FIG. 4 is a schematic diagram of an example SAW tag providing a frequency coded scheme; where the SAW reflector in each track is designed with a different center frequency and the SAW transducer in each track can be wideband or designed to meet the reflector's bandwidth to reduce losses.

FIG. 4 is a schematic diagram of a SAW tag 400 incorporating an orthogonal frequency coded scheme; where the SAW reflectors 401-408 in each track of the two (2) tracks shown is designed to have a different center frequency ($f_1$, $f_2$, $f_3$ and $f_4$). Reflectors 401-408 are laid out in tracks instead of adjacent to each other to reduce losses. The SAW transducer electrodes 421-428 in each track is designed to meet its reflector bandwidth to reduce losses. The SAW transducer's bandwidth is determined by the number of SAW electrodes. The schematic shown in FIG. 4 has the SAW reflectors 401-408 spaced at one of two possible delays ($T_1$ or $T_2$) to yield two broadband pulses as a response for the SAW tag. It is also possible to dither the locations of the SAW reflectors 401-408 in each track (so that they are not in a line as shown), which would result in broader time pulses.

Figure 5:
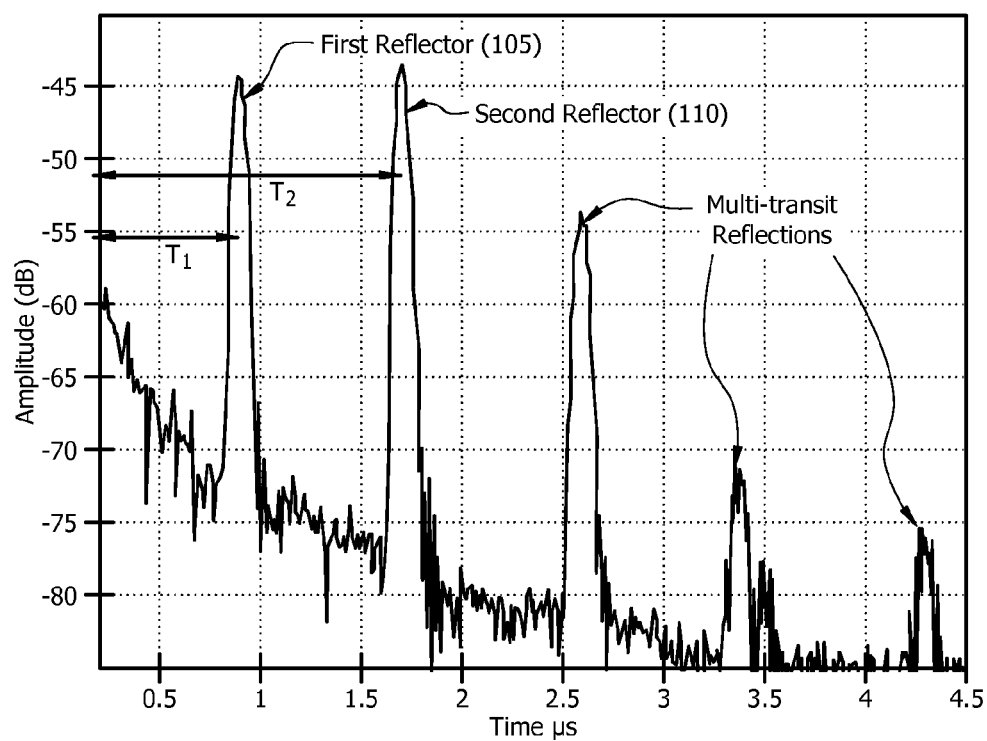
FIG. 5 shows the time domain response of an example SAW tag having two SAW reflectors. Multi-transit reflections shown may be eliminated using a unidirectional SAW transducer.

FIG. 5 shows a time response of an example SAW tag based on SAW tag 100 shown in FIG. 1, showing a peak around 1 μs from SAW reflector 105 (at $T_1$) and a peak around 1.7 μs from SAW reflector 110 at $T_2$, $T_2 > T_1$. One possible frequency specification is the UWB region which is specified by the Federal Communications Commission (FCC) as a fractional bandwidth larger than 20%. In order to ease the line-width requirements for the SAW device, a center frequency of 870 MHz with a span of 174 MHz (20% of the center frequency) can be chosen, which yields a frequency range between 783 MHz and 957 MHz. The multi-transit reflections shown in FIG. 5 may be eliminated using a unidirectional transducer.

In one embodiment, a system including a plurality of disclosed SAW tags interrogates the SAW tags with a transceiver to determine tag parameters, such as to determine the temperature of the individual SAW tags. In sensing applications such as temperature, the SAW reflectors operate by producing a change in the SAW velocity with temperature resulting in a change in the delay of the propagating SAW in the piezoelectric substrate, which is defined by the temperature coefficient of delay (TCD) of the SAW in the piezoelectric substrate.

Figure 6:
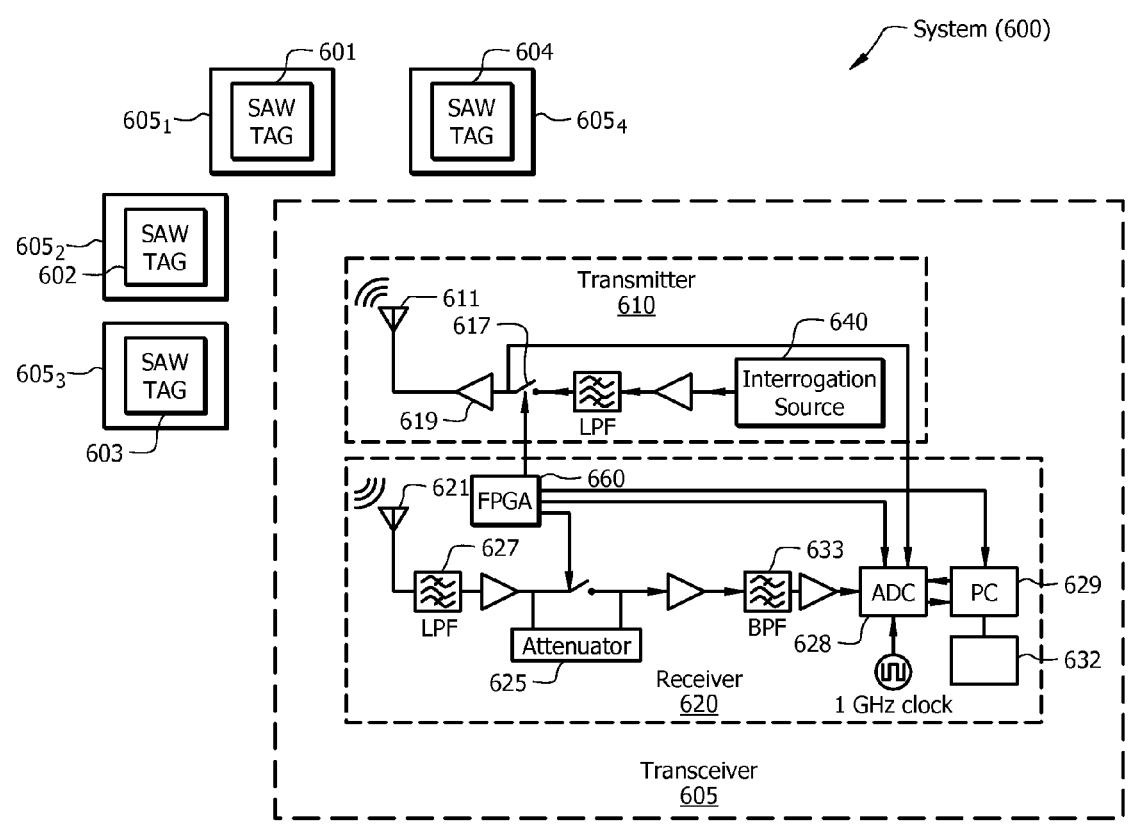
FIG. 6 is a block diagram of an example SAW tag-based coherence multiplexing system including a plurality of SAW tags and a transceiver for implementing coherent multiplexing.

FIG. 6 is a block diagram of a system 600 for SAW tag-based coherent multiplexing, according to an example embodiment including SAW tags 601-604. Each of the SAW tags 601-604 are on at least one piezoelectric substrate "chip" shown as $605_1$, $605_2$, $605_3$ and $605_4$. Transceiver 605 is generally embodied as a printed circuit board (PCB) and includes an interrogation source 640 such as a broadband analog noise source which provides a pulsed interrogation signal that is wirelessly transmitted over the air by the antenna 611, which can be replaced by a digital source (e.g., noise source) that is then converted to an analog signal (e.g., by a digital to analog (D/A) converter) that is wirelessly transmitted using antenna 611 to the SAW tags 601-604 for interrogation. Although not shown, interrogation source 640 is a pulsed source or is a continuous source that is sampled by a sampler that generates pulses. Pulsed interrogation signals avoid the receiver 620 getting saturated by the transmitted interrogation signal, which would prevent recovery of the tag/sensor response.

System 600 includes a field programmable gate array (FPGA) 660 that is coupled to nodes and devices in both the transmitter 610 and the receiver 620. FPGA 660 is configured to function as a system controller for system 600, including as shown controlling switching of switches in both the transmitter 610 and receiver 620. The FPGA 660 can be used to control the switch 617 in the transmitter circuitry shown to transmit the interrogation pulses and simultaneously trigger the ADC 628 for capture of the amplified and filtered pulsed source signal just before additional amplification by the power amplifier 619.

The SAW tags in FIG. 6 shown as SAW tags 601, 602, 603 and 604 can in one embodiment be interrogated with a white Gaussian noise (WGN) signal provided by the interrogation source 640, where the WGN signal before interaction with the SAW tags 601-604 is digitally captured in the receiver 620 via antenna 621, then low pass filtered by the low pass filter (LPF) 627, then attenuation by the optional by-pass attenuator 625 and saving for later correlation with the received SAW tag signals. By-pass attenuator 625 can be eliminated from system 600 by directly capturing the "noise" signal provided by interrogation source 640 before it is amplified and sent to the transmitting antenna 611 for transmission to SAW tags 601-604.

The optional by-pass attenuator 625 when switched into the signal path limits the amplitude of the signal. When the receiving antenna 621 is used to capture the interrogation signal being launched by the antenna 611 the signal levels received are generally large compared to the signals returning from the SAW tags 601-604, and such large signal levels should generally be attenuated before being sent to the ADC 628 since the ADC 628 generally only has a limited voltage range of operation and is configured for the relatively small signal levels returned from the SAW tags 601-604.

ADC 628 is shown using an example sampling rate of 1 GHz provided by the clock shown. The transceiver architecture in FIG. 6 is thus simple, employing subsampling at 1 GHz in order to eliminate any mixing up or down to IF frequencies.

The capture (storing) of the "original" interrogation signal transmitted by antenna 611 coupled to the transmitter 610 (after attenuation by bypass attenuator 625) or directly from the interrogation source 640 allows for a capture of the true system matched filter for correlation against the received SAW sensor tag signals from SAW tags 601, 602, 603 and 604. The received scrambled signal (interrogation and TAG signals) is filtered by LPF 627 than band pass filter 633 which is then digitized by the ADC 628, then correlated by the computing device 629 such as a personal computer (PC) including memory 632 with the original interrogation signal.

All post-signal processing can be performed in the frequency domain by a suitable computing device such as computing device 629 which can perform a fast-Fourier transform (FFT) on the received data. A plurality of integration cycles can be performed to achieve a large dynamic range and recover the desired SAW tag sensing signal from the noise. In theory, the signal can be extracted with small SNRs. The Equation below is a representation of example signal processing using an FFT that can be performed by a computing device such as computing device 629 on signals received by receiver 620 including signals from SAW tags 601-604:

$$H(\tau, f) = \sum_f H^*_{Tx}(f) \cdot H_{Rx}(f) \cdot H_{sys}(f) \cdot e^{j2\pi f \tau}$$

$$H(\tau) = \sum_f H^*_{Tx}(f) \cdot H_{Rx}(f) \cdot H_{sys}(f) \cdot e^{j2\pi f \tau}$$

where $H^*_{Tx}(f)$ is the conjugate of the captured transmit noise, $H_{sys}(f)$ is the system transfer function and includes any channel noise, and $H_{Rx}(f)$ is the received signal given as:

$$H_{Rx}(f) = H_{SAW}(f) \cdot H_{Tx}(f) \cdot e^{-j2\pi f \tau_D}$$

$$H_{Rx}(f) = H_{SAW}(f) \cdot H_{Tx}(f) \cdot e^{-j2\pi f \tau_D}$$

where $H_{SAW}(f)e^{-j2\pi f \tau_D}$ is the SAW RFID transfer function. The delay term ($\tau$) in the exponential term in the above Equation is swept within a delay window where the radio-frequency identification (RFID) reflections from the SAW tags 601-604 are expected to occur. When the net delay of the post-processed signal is zero, the real part of $H(\tau)$ is at a maximum and the imaginary part is at a minimum. Integration over several interrogation cycles, N, results in the coherent peak power to increase by $N^2$, while causing incoherent noise power in the channel to increase by N. The effective coherence time is inversely proportional to the system bandwidth and the side lobe level of the correlation signal is set by the SAW device time response convolved with all system filters.

Figure 7:
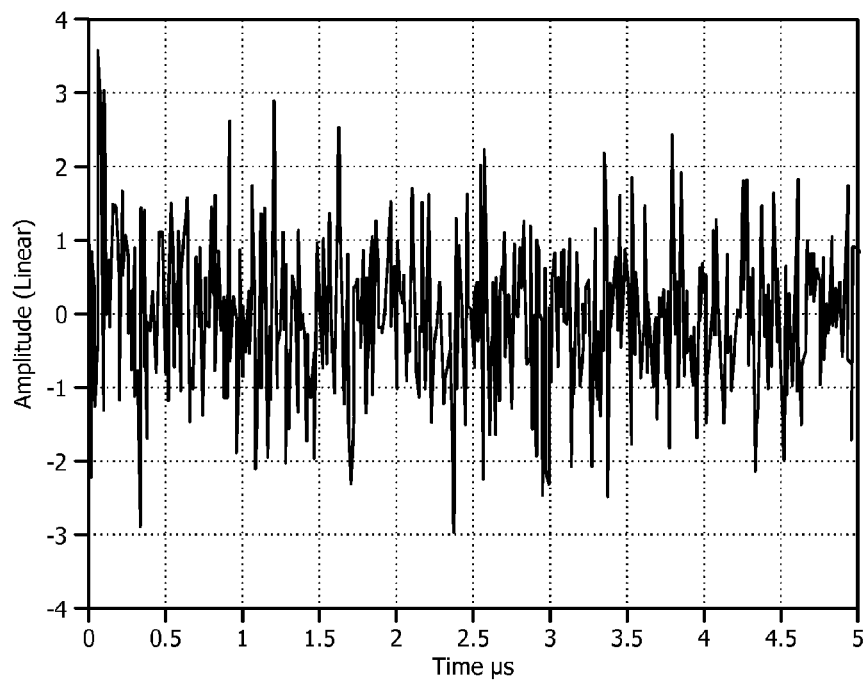
FIG. 7 shows the time domain response of a white Gaussian noise interrogation signal that can be used as the interrogation signals with disclosed embodiments.

FIG. 7 is an example time domain response received by the receiver 620 from SAW tags 601-604 responsive to a WGN interrogation signal transmitted by the transmitter 610 for the system 600 shown in FIG. 6. The received signal at the antenna 621 of receiver 620 is the sum of the convolutions of the interrogation noise signal with each SAW tag signal from TAGs 601 to 604 arriving at the antenna 621 simultaneously. As described above, the received signal after filtering is then digitized by the ADC 628 and correlated by the computing device 629 shown as a PC with the original interrogation (e.g., noise) signal that was captured and stored. Each interrogation signal is a unique signal (e.g. noise signal) which provides inherent code security in the system 600 since the received signal can only be decoded by correlation with the originally transmitted interrogation signal by the transmitter 610. Integration over several interrogation cycles provides increased dynamic range allowing for larger isolation between multiple SAW tags.

Figure 8:
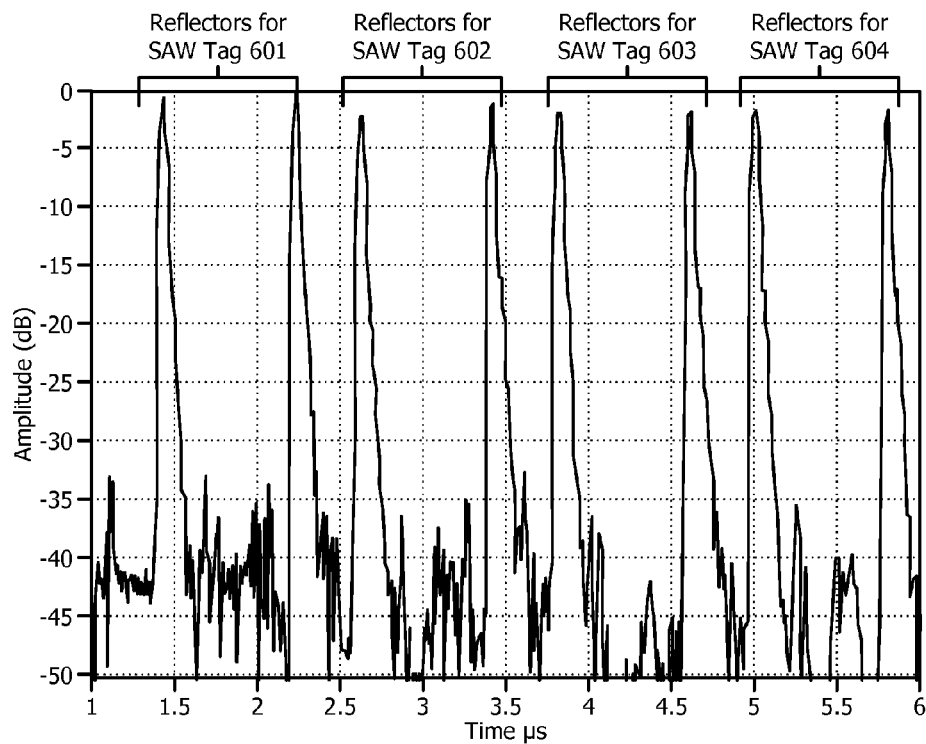
FIG. 8 shows the summation of four ideal SAW tag signals with no multi-transit reflections. The response is normalized to the maximum reflector peak.

In the example system 600 shown in FIG. 6, the four SAW tags 601-604 are generally interrogated simultaneously. FIG. 8 shows the time domain response of the sum of four ideal SAW tag signals from SAW tags 601-604 with no multi-transit echoes. The response amplitudes are normalized to the maximum reflector peak.

Figure 9:
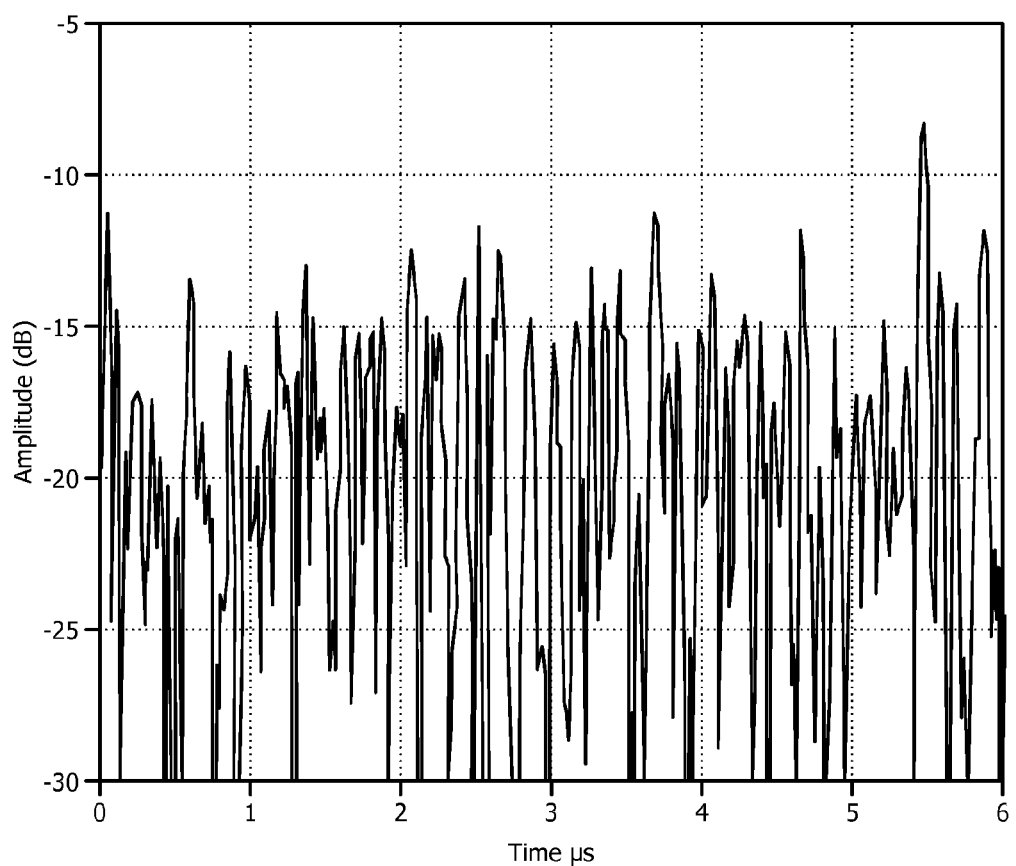
FIG. 9 shows the summation of the convolutions of the interrogation noise signal with the four ideal SAW tag signals shown in FIG. 8. This is the "scrambled" signal received at the transceiver.

FIG. 9 shows the summation of the convolutions of the interrogation noise signal with the four ideal SAW tag signals from the SAW tags 601-604 shown in FIG. 8. This is the signal that will be received at antenna 621 of the receiver 620. The sum of the convolutions of the SAW tag signals with the interrogation WGN signal appears noise-like.

Figure 10:
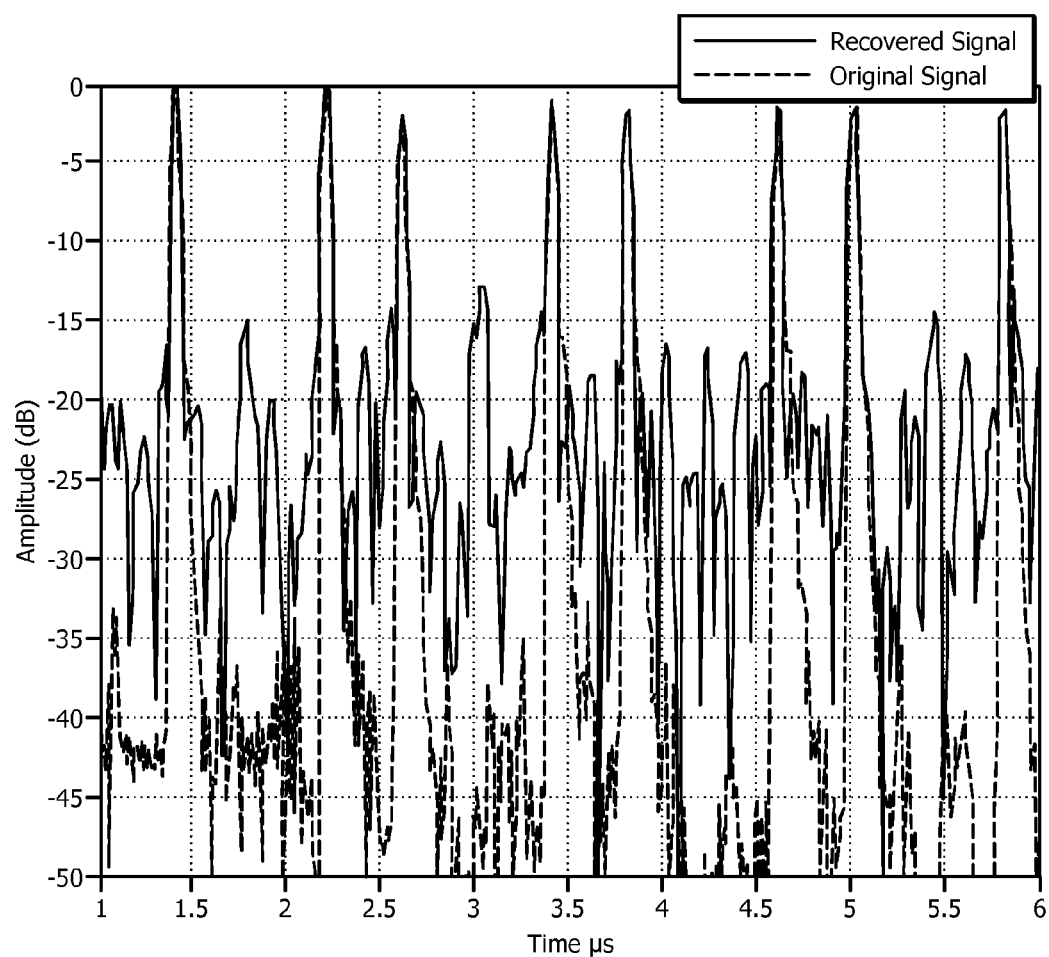
FIG. 10 shows a comparison of the recovered SAW tag signals with the original four SAW tag signals without using integration cycles.

In order to retrieve the SAW tag responses the received noise-like signal in FIG. 9 is correlated against the original interrogation signal. FIG. 10 shows a comparison of the recovered SAW tag signals with the original four SAW tag signals with no integration cycles. As noted above, original refers to the captured interrogation signal, generally a noise interrogation signal. The noise floor of the recovered signal can be reduced by integrating over multiple interrogation cycles. The number of interrogation cycles can be chosen from 1 to N, where N can be very large (>$10^6$ if required) to obtain a desired SNR. Since the noise used for interrogation in each cycle is unique, the integration process enhances the level of the recovered SAW signal.

Figure 11:
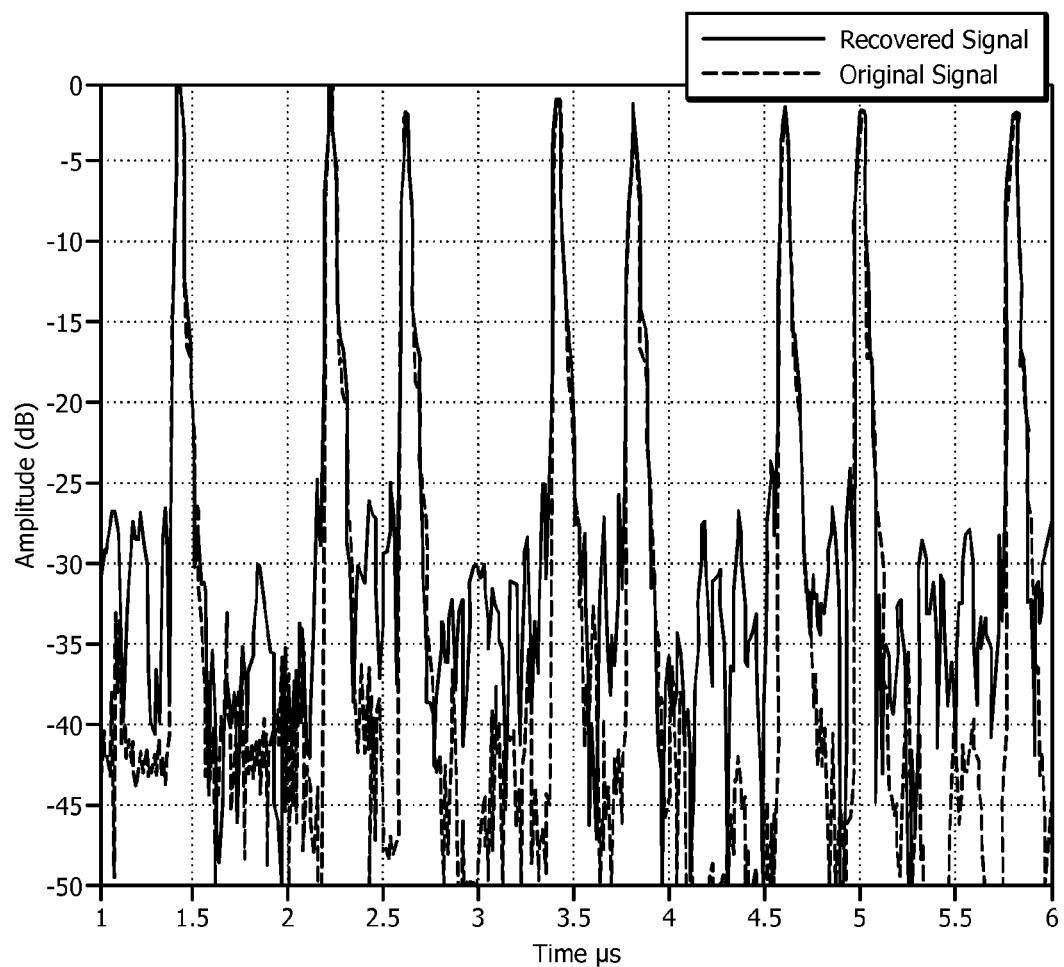
FIG. 11 shows a comparison of the recovered SAW tag signals with the original four SAW tag signals using 10 integration cycles. The SNR is shown improving with increasing the number of integration cycles.
Figure 12:
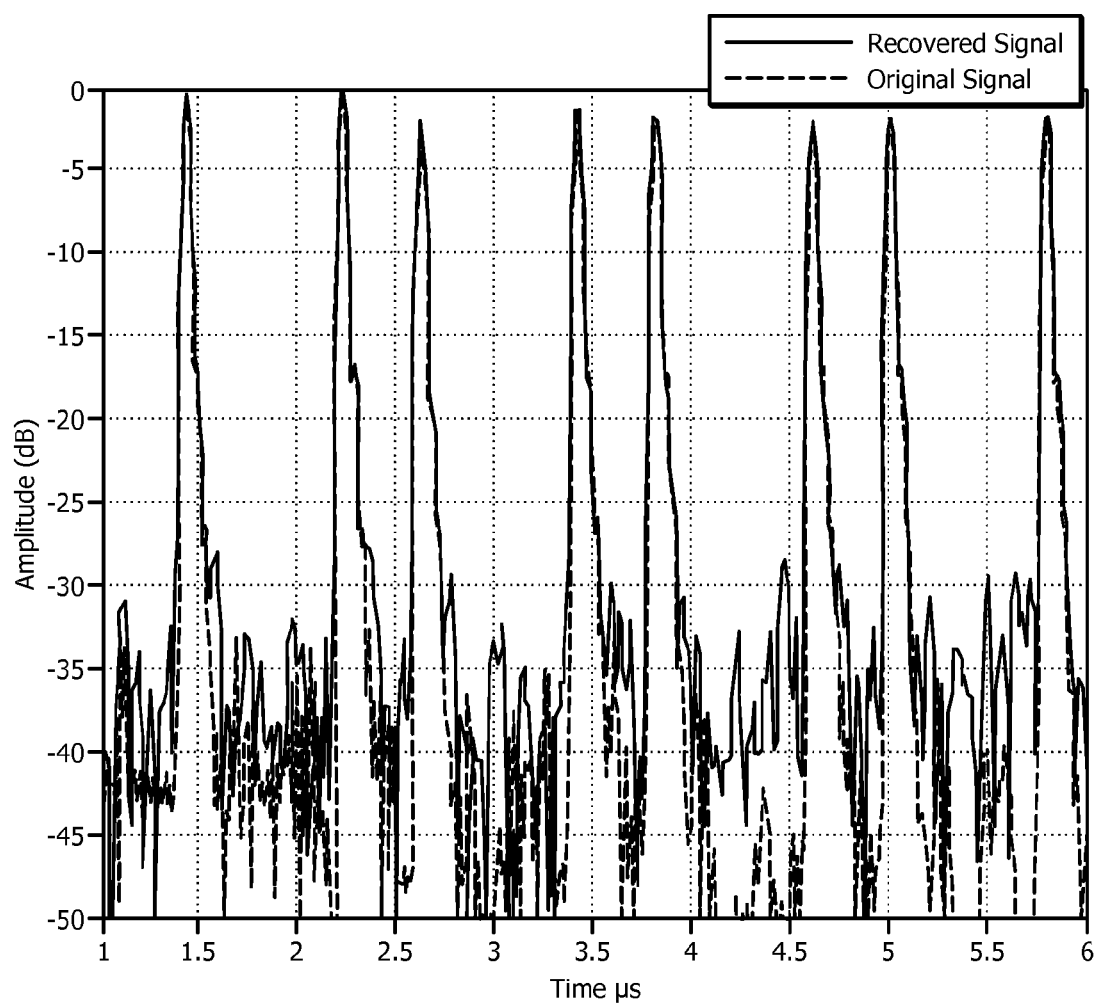
FIG. 12 shows a comparison of the recovered SAW tag signals with the original four SAW tag signals with 50 integration cycles. Comparing FIG. 12 to FIG. 11, the SNR can be seen to improve with more integration cycles.

The SNR improves with multiple integration cycles. FIG. 11 shows a comparison of the recovered SAW tag signals with the original four SAW tag signals with 10 integration cycles. FIG. 12 shows a comparison of the recovered SAW tag signals with the original four SAW tag signals with 50 integration cycles, which can be seen to have an improved SNR compared to FIG. 11.

Disclosed coherence multiplexing apparatus, systems, devices and methods may readily applied to various SAW sensing applications since a wide variety of conditions can result in a change in the SAW velocity for the SAW reflectors resulting a change in the delay of the propagating SAW from the SAW reflectors. The resulting SAW tag-based coherence multiplexing system offers the advantage of simultaneous sensing and tagging. Measurement of the received SAW sensor tag signal in disclosed coherence multiplexing systems allows for sensing of an environmental parameter such as temperature and pressure, gases, liquids, or bio-agents within range of the SAW device.

Disclosed apparatus, systems, devices and methods using the SAW tag-based coherence multiplexing technique disclosed above provide ultra-wide bandwidth operation, security due to noise interrogation, and time and frequency coding per bit. Disclosed approaches can be used in a multi-tag or sensor environment by using proper coding techniques. As described below in the Examples section, SAW tags demonstrated the coding approach and showed the recovery of the tag signal and reduction of noise floor by using multiple integration cycles.

The accuracy of the measured time delay using the disclosed SAW tag-based coherence multiplexed approach is generally limited only by proper calibration to the delay through the transceiver, which was found to be less than one coherence length. Disclosed methods are robust and can be extended and applied to simultaneous sensing and tagging applications, such as temperature sensors and pressure sensors noted above, as well as low cost RFID.

Another application for disclosed SAW tags (sensors) using coherence multiplexing is for operation at cryogenic temperatures or elevated temperatures. Being operable for many years with no power supply makes disclosed systems and methods ideal for use in space and cryogenic systems. Disclosed SAW tags can also be used on rotating equipment such as turbine and propeller blades.

Disclosed SAW tags can be used for SAW hydrogen ($H_2$) sensors. This embodiment allows a number of remote SAW hydrogen sensors to be placed onto a spacecraft to provide leak detection without having to make a hard connection to the vehicle. Disclosed SAW sensors can also be embedded into structures (e.g., into concrete) and still operate allowing long term monitoring of humidity, strain, or corrosion by-products. Disclosed SAW sensors can be used as magnetic field sensors for security systems or for monitoring valve health. Moreover, with sufficient acquisition speed, disclosed SAW tags/sensors can be used as distributed wireless microphones, allowing fault and impact damage on flight vehicles.

EXAMPLES

Disclosed embodiments are further illustrated by the following specific Examples, which should not be construed as limiting the scope or content of this Disclosure in any way.

An SAW tag-based coherence multiplexing system analogous to system 600 shown in FIG. 6 including four different SAW RFID tags, with two Bragg reflectors each, were fabricated and mounted on folded dipole antennas, having a 915 MHz center frequency, 10% fractional bandwidth, and approximately 15 dB loss. The SAW device was mounted with a PCB folded dipole antenna.

The SAW tags were interrogated with an amplified noise source for a 1 µs duration with an output power of −65 dBm/Hz. The noise-pulse had an energy of approximately 0.1 µjoule. The transmit and receive folded dipole antenna had a gain of 2 dBi. The receiver gain was approximately 35 dB. The SAW RFID devices were placed at distances of approximately 1 to 2 ft from the receive antenna.

Figure 13:
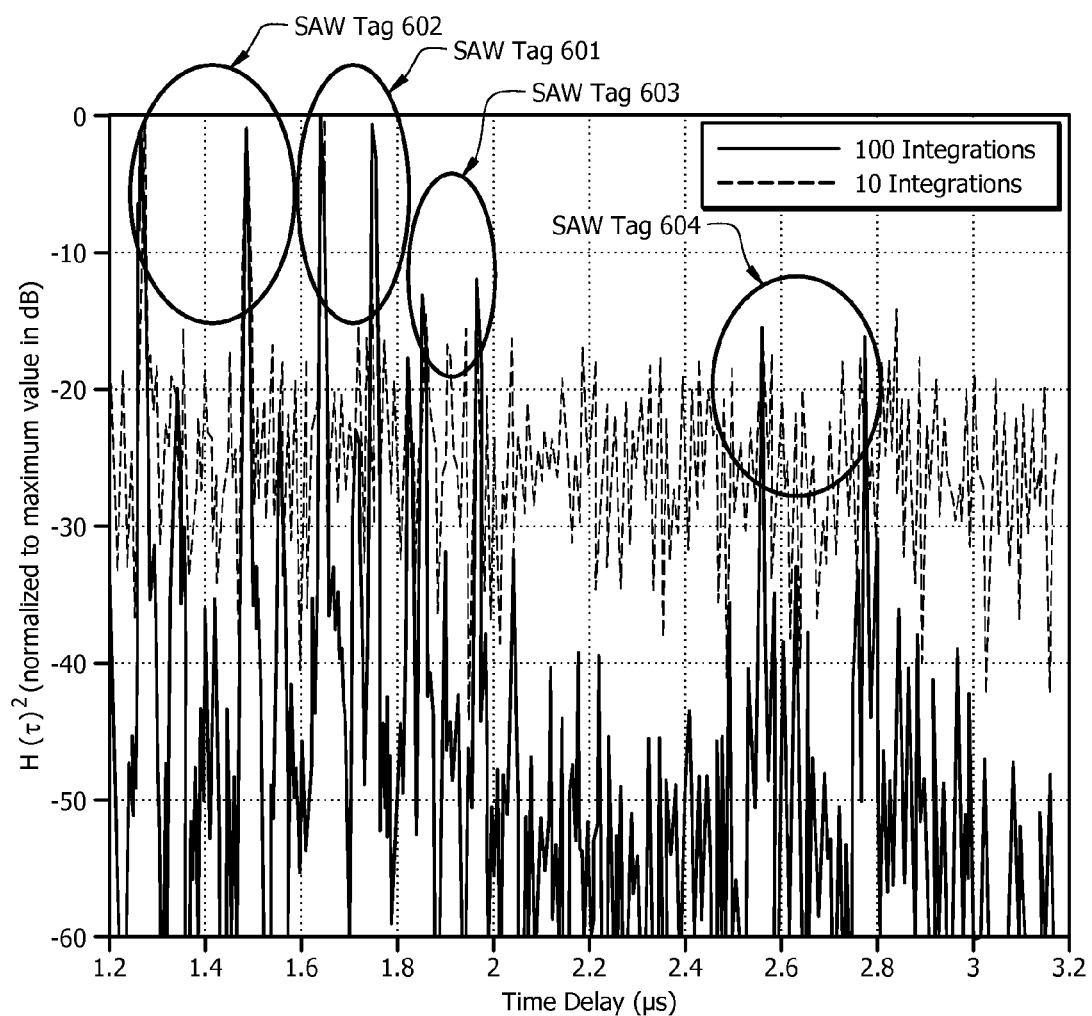
FIG. 13 is a normalized plot of the transfer function $|H(\tau)^2|$ after post-processing with 10 and 100 integrations where it can be seen that the SNR improves with 100 integrations, compared to 10 integrations.

The normalized plot of $|H(\tau)^2|$ after post-processing with 10 and 100 integrations are shown in FIG. 13. The SNR for SAW tags 601 and 602 is dramatically improved from 20 dB, for 10 integrations, to 40 dB for 100 integrations, as theoretically expected. SAW tags 603 and 604 were placed further away from the receive antenna so that there was a 20 dB increase in loss and the tags are almost buried in the noise floor with 10 integrations. However, using 100 integrations allows the tag reflections buried in the noise with 10 integrations to be recovered out of the noise floor. The wirelessly measured reflection sites were compared to RF probed SAW tag data and the accuracy was found to be within one coherence length (about a few nanoseconds). The extracted delay error can be minimized by properly calibrating out the added delay through the transceiver. This was done by measuring a SAW filter of known delay between the transmitter and receiver and accounting for the added system delay; the delay through the system was found to be approximately 320 ns.

Each SAW tag was designed to have two SAW reflectors, and the reflectors for all the SAW tags were spaced a distance of several coherence lengths apart to preclude any code collisions from occurring. Since the system is generally limited by the device bandwidth of 90 MHz and the SAW velocity on a YZ—$LiNbO_3$ substrate is 3488 m/s, this translates to a coherence length of approximately 40 µm (or a coherence time of 10 ns). This data reveals that the SAW reflectors can be spaced much closer together, approximately two coherence lengths or 80 µms apart.

A 1 µs time window corresponds to a length of approximately 3.5 mm on YZ—$LiNbO_3$. Accounting for the round-trip distance to a SAW reflector, if each SAW reflector is spaced 160 µms apart, approximately 20 reflection sites or 10 tags with two reflections each could fit within a 1 µs window. This approach can be extended to sensor applications; with the SAW reflectors placed further away from each other to account for changes in delay due to external sensor stimuli. The use of two SAW reflectors, each placed in a separate track allows for differential measurements in delay, where one track can be used as a reference for temperature compensation and the other can be used to measure delay changes due to sensed parameters.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. For example, based on disclosed concepts, systems can be configured to work with a known (predetermined) interrogation signal such as a chirp for example that could be stored in the receiver for correlation to eliminate the need to capture the interrogation signal in the case of a noise (random) interrogation signal. However, in such a case, the effect of increasing the signal dynamic range due to the noise power changing only by N while desired signal power changes by $N^2$ is lost.

In addition, while a particular feature may have been disclosed with respect to only one of several implementations, such feature may be combined with one or more other features of the other implementations as may be desired and advantageous for any given or particular application.

Thus, the breadth and scope of the subject matter provided in this Disclosure should not be limited by any of the above explicitly described embodiments. Rather, the scope of this Disclosure should be defined in accordance with the following claims and their equivalents.

The invention claimed is:

1. A surface acoustic wave (SAW)-based coherence multiplexing system, comprising:
    a plurality of spaced apart SAW tags each comprising:
    at least one SAW transducer including an interdigitated thin metal film electrode structure on a piezoelectric crystal substrate;

a first SAW reflector comprising a first thin metal film structure on said piezoelectric crystal substrate positioned a first minimum distance from said SAW transducer;

and at least a second SAW reflector comprising a second thin metal film structure on said piezoelectric crystal substrate positioned a second minimum distance not equal to said first minimum distance, and a transceiver including (i) a wireless transmitter having a signal source providing a source signal and circuitry for transmitting interrogation pulses including at least a first and a second interrogation pulse different from said first interrogation pulse toward said plurality of SAW tags, and (ii) a wireless receiver for receiving and processing received signals response signals from said plurality of SAW tags, said receiver receiving scrambled signals being a convolution of said interrogation pulses with said response signals from said plurality of SAW tags, and including a computing device which implements an algorithm that correlates said interrogation pulses or said source signal against said scrambled signals to generate tag responses for each of said plurality of SAW tags;

wherein said first SAW reflector and said second SAW reflector are both configured to have a different center frequency.

2. The system of claim 1, wherein said interrogation pulses comprise sampled ultra-wideband (UWB) white Gaussian noise signals.

3. The system of claim 1, wherein said first SAW reflector includes a plurality of reflector elements positioned in a first linear track all at said first minimum distance and said second SAW reflector includes a plurality of reflector elements positioned in a second linear track all at said second minimum distance.

4. The system of claim 1, wherein said first SAW reflector and said second SAW reflector comprise Reflective Multistrip SAW Couplers (RMSCs) having curved elements.

5. The system of claim 1, wherein said first SAW reflector and said second SAW reflector comprise Bragg reflectors.

6. The system of claim 1, wherein said first SAW reflector and said second SAW reflector are coded with time division multiple access (TDMA) coding.

7. The system of claim 1, wherein said first SAW reflector and said second SAW reflector are coded with frequency coding.

8. A method of wireless sensing using coherence multiplexing, comprising:

transmitting interrogation pulses including at least a first interrogation pulse and a second interrogation pulse different from said first interrogation pulse toward a plurality of spaced apart surface acoustic wave (SAW) tags each including at least one SAW transducer, a first SAW reflector positioned a first minimum distance from said SAW transducer and a second SAW reflector positioned a second minimum distance from said SAW transducer not equal to said first minimum distance;

wirelessly receiving response signals from said plurality of SAW tags;

processing scrambled signals comprising said response signals from said plurality of SAW tags convolved with said interrogation pulses, and correlating said interrogation pulses against said scrambled signals to generate tag responses for each of said plurality of SAW tags;

wherein said first SAW reflector and said second SAW reflector are both configured to have a different center frequency.

9. The method of claim 8, wherein said interrogation pulses comprise sampled ultra-wideband (UWB) white Gaussian noise signals.

10. The method of claim 8, wherein said first SAW reflector and said second SAW reflector are coded with time division multiple access (TDMA) coding.

11. The method of claim 8, wherein said first SAW reflector and said second SAW reflector are coded with frequency coding.

12. The method of claim 8, wherein said method includes a plurality of integrations.

13. The method of claim 8, wherein said first SAW reflector includes a plurality of reflector elements positioned in a first linear track all at said first minimum distance and said second SAW reflector includes a plurality of reflector elements positioned in a second linear track all at said second minimum distance.

14. The method of claim 8, further comprising capturing signals from a signal source that provides a source signal in a transmitter used for said transmitting for said interrogation pulses before wireless transmission in said correlating.

15. The method of claim 8, further comprising capturing said interrogation pulses after transmission by a transmitter having a signal source providing a source signal for transmitting said interrogation pulses using a receiver for receiving said interrogation pulses for use in said correlating.

16. A surface acoustic wave (SAW) tag, comprising:

at least one SAW transducer including an interdigitated thin metal film electrode structure on a piezoelectric crystal substrate;

a first SAW reflector comprising a first thin metal film structure on said piezoelectric crystal substrate positioned a first minimum distance from said SAW transducer; and at least a second SAW reflector comprising a second thin metal film structure on said piezoelectric crystal substrate positioned a second minimum distance not equal to said first minimum distance wherein said first SAW reflector and said second SAW reflector are both configured to have a different center frequency.

17. The SAW tag of claim 16, wherein said first SAW reflector and said second SAW reflector comprise Reflective Multistrip SAW Couplers (RMSCs) having curved elements.

* * * * *